United States Patent [19]

Moscony et al.

[11] 3,751,250

[45] Aug. 7, 1973

[54] METHOD FOR PHOTOEXPOSING A COATED SHEET PRIOR TO ETCHING

[75] Inventors: John Joseph Moscony, Lancaster; Ronald Lester Kennard, Landisville, both of Pa.

[73] Assignee: RCA Corporation, New York, N.Y.

[22] Filed: May 8, 1972

[21] Appl. No.: 251,384

[52] U.S. Cl. .......................... 96/36, 96/383, 355/87, 355/91

[51] Int. Cl. .......................... G03c 5/00

[58] Field of Search .......................... 96/36, 38.3, 44; 355/87, 91; 95/1

[56] References Cited

UNITED STATES PATENTS

| | | | |
|---|---|---|---|
| 2,536,383 | 1/1951 | Mears et al. | 96/38.3 |
| 3,600,243 | 8/1971 | Larocque et al. | 96/36.2 |
| 3,547,537 | 12/1970 | Betron | 355/87 X |
| 3,658,417 | 4/1972 | Lewis et al. | 355/87 X |
| 3,259,046 | 7/1966 | Nishimura | 355/91 |

*Primary Examiner*—Norman G. Torchin
*Assistant Examiner*—Edward C. Kimlin
*Attorney*—Glenn H. Bruestle and Le Roy Greenspan

[57] ABSTRACT

A method for photoexposing a coated sheet in a vacuum printing frame employs at least one glass plate including a photographic master pattern in the central area thereof, and peripheral areas having surfaces that have been sandblasted, etched, or otherwise removed to a depth of at least 0.003 inch.

6 Claims, 3 Drawing Figures

PATENTED AUG 7 1973 3,751,250

METHOD FOR PHOTOEXPOSING A COATED SHEET PRIOR TO ETCHING

BACKGROUND OF THE INVENTION

This invention relates to a novel method for photoexposing a coated sheet prior to etching. The novel method may be used, for example, in preparing apertured or slit masks for use in color television picture tubes.

The preparation of apertured masks by photoexposure and etching has been described previously; for example, in U. S. Pat. Nos. 2,750,524 to F. G. Braham, 3,199,430 to S. A. Brown, and 3,313,225 to N. B. Mears. In a typical process, a thin sheet of metal, such as cold rolled steel or a copper-nickel alloy, is coated on both major surfaces with a light-sensitive resist or enamel. Then, the coated sheet is positioned between two glass plates, each plate carrying a photographic master pattern, each pattern being accurately positioned with respect to the other. Each plate is usually comprised of a central area bearing the photographic master pattern and a peripheral area which is clear. The glass plates are mounted in spaced relation from one another in an equipment referred to as a vacuum printing frame. When the coated sheet is in the desired position, the frame is evacuated, whereby the glass plates are drawn together so that the master patterns are held in intimate contact with the coatings on the sheet. Then, the coatings are exposed to light which passes through the glass plates for a time interval until the coatings are suitably exposed. The frame is then devacuated; that is, brought back to atmospheric pressure. The glass plates are separated and the metal sheet with the exposed coatings thereon is removed from the frame. The exposed coatings may now be developed by removing the more-soluble portions thereof. Then, the sheet may be selectively etched, and finally the less-soluble portions of the coatings removed from the sheet.

One of the problems encountered previously is the relatively long time period required for evacuating and devacuating the frame during production operations. Where the photographic master is a raised pattern of light-absorbing particles in a binder, such as silver-metal particles or carbon particles in gelatin, grooves are sometimes cut in the coatings on the peripheral areas of the plate to speed the evacuation and devacuation processes. Even with these different expedients, evacuation times of 45 to 150 seconds are required for each exposure. Where the master pattern is an array of plated metal areas, the master is substantially flush with the surface of the glass plate, and the time periods required for evacuating and devacuating the frame may be even longer. When shorter time periods for evacuation and devacuation can be realized, the output from the frame can be increased.

SUMMARY OF THE INVENTION

The novel method employs at least one glass plate, and preferably two plates, including a central area carrying the photographic master pattern and peripheral areas of the plate at least a portion having surfaces that have been sandblasted, etched, or otherwise removed to a depth of at least 0.003 inch. Preferably, these surfaces should be rough. The novel method includes the steps employed in prior methods of coating a sheet with a light-sensitive resist, positioning the coated sheet in a vacuum printing frame, evacuating the frame, exposing the coating or coatings, and then devacuating the frame.

By using one or more glass plates which have peripheral areas with surfaces that are removed as indicated above, the time required for evacuating and devacuating the frame can be substantially reduced. Evacuation times of 20 seconds have been achieved on a production schedule, which could increase the output of the frame more than 100 percent. The novel method is otherwise equivalent in performance to prior methods.

DESCRIPTION OF THE PREFERRED EMBODIMENT

Figure 1:
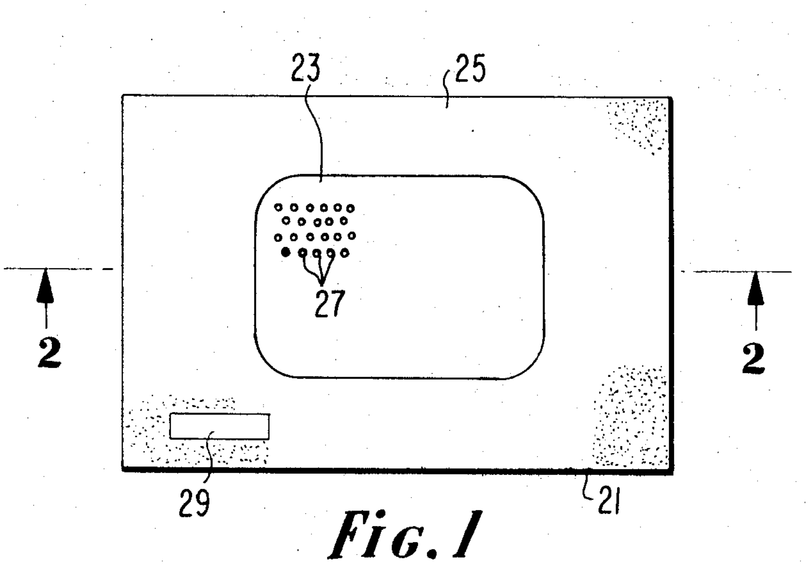
FIG. 1 is a front view of a glass plate including a master pattern used in the method of the invention.
Figure 2:
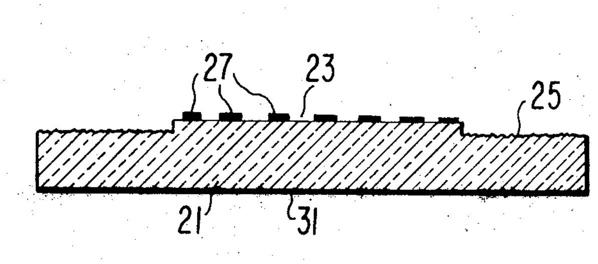
FIG. 2 is a sectional view of the plate shown in FIG. 1 viewed along section line 2—2.

FIGS. 1 and 2 show a typical glass plate 21 used in the novel method. One major surface of the plate 21 includes a central area 23 and a peripheral area 25 around the central area 23. The central area carries a photographic master pattern 27. Except for a window 29, the surfaces of the peripheral area 25 are removed, as by sandblasting, to a depth of at least 0.003 inch and as much as 0.010 inch, and preferably about 0.006 inch, and the new surfaces have a rough texture. The window 29 (which is an optional feature) is a polished rectangular area of the plate 21. The opposite major surface 31 of the plate is also polished.

The glass plate may be ordinary plate glass of sufficient thickness to withstand the mechanical stresses imposed by the novel method. Thicknesses in the range of about 0.10 to 1.00 inch are practical. The surfaces of the peripheral areas 25 may be removed by sandblasting, etching, grinding or other method of removal. Sandblasting may be carried out in the normal way by masking the areas which are not to be sandblasted and then applying a jet of gas or liquid carrying abrasive particles such as alumina or sand of the desired particle size and type. Etching may be carried out with a known etchant containing; for example, hydrogen fluoride and ammonium bifluoride. Grinding may be carried out by mechanically abrading the surface with an abrasive such as silicon carbide particles. The new surfaces may be smooth but are preferably rough.

The photographic master pattern 27 may be produced from a coating of metal such as chromium or nickel, or from a similar coating of opaque particles in a binder such as silver or carbon particles in gelatin. The pattern may be made by any one of the methods known in the art, for example, U. S. Pat. Nos. 3,561,963 to W. M. Kiba and 3,600,243 to A. P. LaRocque. The pattern is preferably of metal less than 0.001 inch thick made by a method disclosed in a U. S. application entitled, "Method of Preparing an Imperfect Pattern of Metallized Portions on a Substrate," filed by J. J. Moscony and R. L. Kennard.

Figure 3:
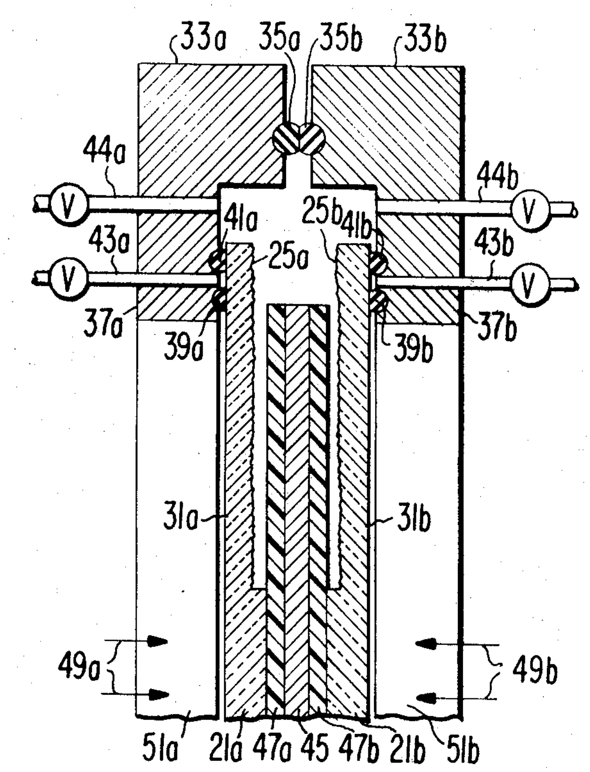
FIG. 3 is a sectional view of a broken-away coatings of a vacuum printing frame shown during the step of exposing a coated metal sheet through two glass plates of the type shown in FIG. 1.

In one embodiment, wherein the novel method is used to prepare apertured masks for color television picture tubes, the glass plate is about 32 inches wide, 24 inches high and 0.25 inch thick. Two such plates 21*a* and 21*b* are positioned in a vacuum printing frame comprising a pair of matched frame portions 33*a* and 33*b* as shown in FIG. 3. The frame portions include opposed rubber gaskets 35*a* and 35*b* around the frame portions 33*a* and 33*b* respectively, which gaskets are capable of maintaining a vacuum seal when placed against one another. Each frame portion 33*a* (or 33*b*) has a ledge portion 37*a* (or 37*b*) respectively, which bears against the opposite major surface 31*a* (or 31*b*) around the edge of the peripheral areas 25*a* (or 25*b*) of a glass plate (21*a* or 21*b*). A pair of concentric rubber gaskets 39*a* and 41*a* on one ledge 37*a*, and 39*b* and 41*b* on the other ledge 37*b*, separates the plate 21*a* from the ledge 37*a* and the plate 21*b* from the ledge 37*b* respectively, providing vacuum seals and resilient surfaces for the plates 21*a* and 21*b* to bear against. The frame portion 33*a* is also provided with first means 43*a* including piping and valves for evacuating the volume enclosed by the frame portions 33*a*, the glass plate 21*a* and the gaskets 39*a* and 41*a*. The frame portion 33*b* is also provided with second means 43*b* including piping and valves for evacuating the volume enclosed by the frame portion 33*b*, the glass plate 21*b* and the gaskets 39*b* and 41*b*. The frame portions 33*a* and 33*b* are also provided with third means 44*a* and 44*b* for evacuating the volume enclosed by the frame portions 33*a* and 33*b*. These means are also used to devacuate (bring to atmospheric pressure) the frame.

In one embodiment of the invention, the two glass plates 21*a* and 21*b* are placed in their respective frame portions 33*a* and 33*b* with the master patterns and sandblasted peripheral areas facing one another. The master patterns on the plates are hexagonal arrays of opaque circular dots of nickel metal. The arrays have an equal number of dots and identical center-to-center spacing (although the diameters of the dots may differ according to the design of the desired product). The plates are aligned so that the center lines of corresponding dots on the two plates coincide. The plates are held in place by vacuums applied through the first and second evacuating means 43*a* and 43*b*.

In the one embodiment of the novel method, a metal sheet of cold-rolled steel, about 0.020-inch thick, is coated on both surfaces with a photoresist, such as dichromated fish glue. The metal sheet 45 carrying the two coatings 47*a* and 47*b* on opposed major surfaces is slid between the two glass plates 21*a* and 21*b* and stopped at the desired position. The window 29, which is an optional feature, may be used to observe whether the sheet 45 is unwrinkled. The vacuum printing frame is evacuated by drawing air out through the evacuating means 44*a* and 44*b*. Atmospheric pressure outside the frame presses the master patterns on the glass plates 21*a* and 21*b* against the photoresist coatings 47*a* and 47*b* respectively as shown in FIG. 3. The evacuation step requires about 30 seconds for completion, whereas previously more than 90 seconds was required.

With the vacuum applied, light shown by the arrows 49*a* and 49*b* from high intensity light sources positioned on both sides of the frame is flooded from both sides through the open areas 51*a* and 51*b* of the frame portions 33*a* and 33*b*, through the glass plates 21*a* and 21*b* and incident upon the photoresist coatings 47*a* and 47*b*; thereby exposing the coatings to hardening radiation. When the exposure is completed, the light is shuttered, the vacuum frame is devacuated through the third means 44*a* and 44*b*, and the exposed coated metal sheet may be removed from the vacuum frame. Suitable light sources may be electric arc lamps or xenon pulse lamps.

The novel method may be used for photoexposing either one or both sides of the major surfaces of the coated sheet. The coated sheet may be fabricated into any of the products normally made by photoexposure. Advantages of the novel method are best realized with processes requiring the photoexposure of relatively large areas where large glass plates and rapid evacuation of relatively large volumes are required.

We claim:

1. In a method for photoexposing a coated sheet, the steps comprising 1. coating said sheet on at least one major surface thereof with a light-sensitive resist,
2. positioning said sheet in a vacuum printing frame, said frame including at least one glass plate having a master pattern on the central area of a major surface of said plate, and a peripheral area around said central area, at least a portion of the surfaces of said peripheral area having been removed to a depth of at least 0.003 inch, said coated surface of said sheet being positioned opposite said master pattern.
3. evacuating said frame to draw said pattern into intimate contact with said coated surface,
4. exposing said coating to hardening radiation projected through said pattern
5. and then devacuating said frame and removing said pattern from contact with said coated surface.

2. The method defined in claim 1 wherein said master pattern is an array of metal coated areas, said array being less than 0.001-inch thick.

3. The method defined in claim 1 wherein said surface portion of said peripheral areas has been removed by sandblasting.

4. The method defined in claim 1 wherein said surface portion of said peripheral areas has been removed by etching.

5. The method defined in claim 1 wherein said surface portion of said peripheral areas has been removed by grinding.

6. In a method for making an apertured mask for a cathode-ray tube comprising 1. coating a metal sheet on both major surfaces thereof with a light-sensitive resist,
2. positioning said coated sheet between a matched pair of glass plates, each plate having on the major surface opposite said sheet a master pattern on the central area thereof and a peripheral area surrounding said pattern which is free of said master pattern, the major portion of said peripheral area having been sandblasted to a depth of between about 0.003 inch and 0.010 inch,
3. evacuating the volume between said plates so as to draw said plates into intimate contact with the major surfaces of said sheet,
4. exposing said coatings by projecting light through said master patterns,
5. bringing said evacuated volume back up to atmospheric pressure,
6. and then removing said sheet from between said plates.

* * * * *